United States Patent
Krampitz et al.

(10) Patent No.: US 6,706,443 B1
(45) Date of Patent: Mar. 16, 2004

(54) PROCESS FOR PREPARING LITHIUM MANGANESE OXIDES

(76) Inventors: Horst Krampitz, Apelerner StraBe 20, D-31867 Pohle (DE); Gerhard Wohner, Erlenweg 13D, D-30827 Garbsen (DE)

(*) Notice: Subject to any disclaimer, the term of this patent is extended or adjusted under 35 U.S.C. 154(b) by 0 days.

(21) Appl. No.: 09/331,919

(22) PCT Filed: Dec. 22, 1997

(86) PCT No.: PCT/EP97/07228

§ 371 (c)(1),
(2), (4) Date: Aug. 19, 1999

(87) PCT Pub. No.: WO98/29342

PCT Pub. Date: Jul. 9, 1998

(30) Foreign Application Priority Data

Dec. 30, 1996 (DE) .......................... 196 54 688

(51) Int. Cl.⁷ .......................... H01M 4/50; H01M 4/58; H01M 6/00
(52) U.S. Cl. .................... 429/224; 29/623.1; 429/231.1
(58) Field of Search ................. 429/224, 221, 429/223, 231.1, 231.8; 29/623.1

(56) References Cited

U.S. PATENT DOCUMENTS

| | | | | |
|---|---|---|---|---|
| 5,618,640 A | * | 4/1997 | Idota et al. ............... | 429/218.1 |
| 5,630,993 A | * | 5/1997 | Amatucci et al. ........... | 423/594 |
| 5,948,565 A | * | 9/1999 | Kelder ...................... | 429/224 |
| 5,981,106 A | * | 11/1999 | Amine et al. ............... | 429/224 |
| 6,024,934 A | * | 2/2000 | Amine et al. ............... | 423/592 |

FOREIGN PATENT DOCUMENTS

| | | | |
|---|---|---|---|
| EP | 0813 256 A | | 12/1997 |
| JP | 2-109260 | * | 4/1990 |
| WO | 94 29915 A | | 12/1994 |

OTHER PUBLICATIONS

Patent Abstracts of Japan, vol. 014, No. 324 (E–0951), Jul. 11, 1990 & JP 02 109260 a (Matsushita Electric) Apr. 20, 1990, siehe Zusammenfassung.

Matsuharu Tabuchi: "electrochemical and magnetic properties . . . " Solid State Ionics, Bd. 89, Nr. 1–2, Aug. 1996, Holland, Seiten 56–63, XP002065002, siehe Seite 54—Seite 55.

* cited by examiner

*Primary Examiner*—Carol Chaney
*Assistant Examiner*—Tracy Dove

(57) ABSTRACT

A process for the preparation of a lithium manganese oxide by reaction of at least one lithium compound and at least one manganese compound under hydrothermal conditions, i.e., heated aqueous solutions under subatmospheric pressures. A lithium manganese oxide of this type may be used as cathode material for an electrochemical cell.

13 Claims, No Drawings

PROCESS FOR PREPARING LITHIUM MANGANESE OXIDES

The present invention relates to a process for the preparation of a lithium manganese oxide by reacting at least one lithium compound and at least one manganese compound under hydrothermal conditions, that is to say from heated aqueous solutions under subatmospheric pressures, to a lithium manganese oxide of this type per se and to the use thereof as cathode material for electrochemical cells.

Processes for the preparation of lithium manganese oxides of the approximate composition $LiMn_2O_4$ are known per se.

Thus, U.S. Pat. No. 4,980,251 describes a process for the preparation of a lithium manganese oxide of the formula $Li_{1-x}Mn_2O_4$ with $0 \leq x < 1$ by a solid phase reaction in which the corresponding lithium manganese oxide is obtained by mixing the corresponding oxides and/or carbonates together and heating the resulting mixtures in an oxidizing atmosphere to a temperature in the range from 200 to 600° C. This results, as stated in U.S. Pat. No. 4,980,251, in spinels with exceptionally high BET surface areas of, for example, more than 30 m$^2$/g with, at the same time, poor crystallinity. Spinels of this type are said according to the publication to be particularly suitable for use in electrochemical cells.

DE-A-43 27 760 relates to a process for the preparation of a positive electrode for lithium secondary batteries whose active material consists of a lithium manganese oxide which has a spinel structure and which is obtained by mixing manganese dioxide with lithium formate and/or lithium acetate and subsequently heating the mixture at a temperature of from 550 to 800° C., followed by grinding.

Another process for the preparation of such oxides with a spinel structure is claimed in U.S. Pat. No. 5,135,732. In this case, firstly a gelatinous precipitate is formed by mixing stoichiometric amounts of an aqueous solution of lithium hydroxide and manganese acetate in the presence of a base at a pH of approximately 7. This precipitate is then dried at 60 to 150° C. to form a xerogel. Finally, the xerogel is heated to a temperature of from 200 to 600° C., resulting in a lithium manganese spinel.

DE-A 195 19 044 describes lithium- and manganese(III/IV)-containing spinels with a specific surface area of from 0.1 to 4 m$^2$/g, and the use thereof as cathode material for electrochemical cells. The process indicated for the preparation of the spinels claimed therein is reaction of the starting compounds at elevated temperature.

However, the abovementioned processes have disadvantages with regard to the homogeneity of the resulting products. Furthermore, these processes often result in by-products which are unusable or usable only with difficulty, such as, for example, salts and off-gases.

Although the prior art publications discussed above also disclose the use of the oxides prepared therein as cathode material in electrochemical cells, the oxides with a spinel structure prepared by the prior art processes show a comparatively poor and often inadequate cycle stability on use as cathode material in electrochemical cells.

The use of $LiCoO_2$ and $LiNiO_2$ as cathode materials for electrochemical cells is the state of the art. Because of the relatively high material costs, the limited availability of cobalt, the environmental objections thereto and a potential danger associated with use of these compounds on overcharging, there is great interest in replacing the abovementioned compounds by, for example, lithium manganese oxides with a spinel structure, as also proposed in the prior art publications quoted above. Thus, for example, D. Fouchard et al. describe, in a scientific paper in "*The Electrochemical Society Proceedings*", vol. 94–28, page 348, the use of lithium manganese oxides with a spinel structure in electrochemical cells.

In view of the above prior art, the object of the present invention is to provide a process which, on the one hand, makes it possible to prepare lithium manganese oxides, in particular inter alia pure-phase lithium manganese oxides with a spinel structure, and which furthermore can be carried out on the industrial scale without difficulty and with avoidance of by-products which cannot be utilized or are even hazardous, and results in lithium manganese oxides with very good electrochemical properties.

This object is achieved by a process for the preparation of a lithium manganese oxide of the formula $Li_{1.5-x}Mn_2O_4$ where the value of x satisfies the relation $0 \leq x < 1.5$, which comprises the following step: reaction of at least one lithium compound and at least one manganese compound, characterized in that the reaction is carried out in an aqueous medium at a temperature in the range from 80 to 500° C. under a pressure of from $1 \times 10^5$ Pa to $5 \times 10^7$ Pa.

As is evident from what has been said above, it is possible in the process according to the invention to obtain not only lithium manganese oxides with a spinel structure and the approximate composition $LiMn_2O_4$, but also oxides with a very small content of lithium, including $\lambda$-$MnO_2$. However, an oxide with a spinel structure is preferably obtained.

Although it is possible in principle to employ all lithium compounds in the process according to the invention, those preferably employed are $Li_2O$, $LiOH$, $LiCl$, $LiNO_3$, $Li_2CO_3$, Li carboxylates such as, for example, Li formates or Li acetate, or a mixture of two or more thereof.

There are also in principle no restrictions concerning the manganese compounds which can be employed in the process according to the invention. However, the manganese compound preferably employed is $MnO_2$, $MnO$, $MnOOH$, $Mn_2O_3$, $Mn_3O_4$, $MnCO_3$, $Mn(NO_3)_2$, Mn carboxylates such as, for example, Mn formate or Mn acetate or a mixture of two or more thereof, those employed being in particular oxidic manganese raw materials and manganese mixed oxides such as, for example, $MnO$, $MnOOH$, $Mn_2O_3$, $Mn_3O_4$ and $MnCO_3$, and mixtures of two or more thereof.

It is also possible furthermore for the lithium manganese oxides prepared according to the invention to contain in addition another metal M or a mixture of two or more other metals, preferably a metal of group IIa, IIIa, IVa, IIb, IIIb, IVb, VIb, VIIb or VIII of the Periodic Table, or a mixture of two or more thereof, and, in particular, iron, cobalt, nickel, titanium, boron, aluminium or a mixtureof two or more therof, resulting in oxides of the general formula

$Li_{1.5-x}M_zMn_{2-z}O_4$, where x is as defined above, and the value of z satisfies the relation $0.01 \leq z \leq 1$.

Metal-doped Li—Mn-oxides of this type are prepared by employing in the reaction according to the invention a salt of a metal or a mixture of two or more thereof, as defined above, preferably an Fe, Co, Ni salt or a mixture of two or more thereof, in each case in the required amount.

Accordingly, the present invention also relates to a process for the preparation of a lithium manganese oxide of the formula $Li_{1.5-x}M_zMn_{2-z}O_4$ where the value of x satisfies the relation $0 \leq x \leq 1.5$, M is a metal of group IIa, IIIa, IVa, IIb, IIIb, IVb, VIb, VIIb or VIII of the Periodic Table, or a mixture of two or more thereof, and the value of z satisfies the relation $0.01 \leq z \leq 1$, preferably the relation $0.1 \leq z \leq 0.4$, which comprises the following stage: reaction of at least one lithium compound, at least one manganese compound and at least one compound of a metal as defined above, characterized in that the reaction is carried out in an aqueous medium at a temperature in the range from 80 to 500° C. under a pressure of from $1 \times 10^5$ Pa to $5 \times 10^7$ Pa.

The lithium compound and manganese compound are preferably employed in an amount such that the manganese:lithium molar ratio is 2:approximately 1, although Mn:Li molar ratios of from 2:approximately 1.5 to approximately 2.5, preferably 2:approximately 1.3 to approximately 0.6, can also be chosen.

The special feature of the process according to the invention is to be regarded as being the reaction of the lithium compound and manganese compound under hydrothermal conditions. This means that the reaction takes place in an aqueous medium. The reaction takes place at a temperature in the range from approximately 80 to approximately 500° C., preferably approximately 100 to approximately 350° C. and, in particular, approximately 150 to approximately 250° C.

The reaction is carried out under a pressure of approximately $1 \times 10^5$ Pa to approximately $5 \times 10^7$ Pa, preferably approximately $1 \times 10^6$ Pa to approximately $5 \times 10^6$ Pa and, in particular, under approximately $1.5 \times 10^6$ Pa to approximately $2.5 \times 10^6$ Pa.

Depending on the components employed, the actual reaction can be followed by a washing process to remove dissolved impurities present in the metal salts employed, such as, for example, sulphates, Na and K salts, and other components which are not a constituent of the spinel according to the invention.

The product obtained in the reaction in the present process can additionally be dried, the temperatures used for this preferably being in a range from approximately 60 to approximately 200° C., furthermore preferably approximately 100 to approximately 150° C. and, in particular, approximately 120 to approximately 135° C.

It is furthermore possible for the reaction or for the reaction and drying to be followed by the product obtained thereby being additionally heat-treated, this preferably being done at a temperature in the range from approximately 200 to approximately 900° C., furthermore preferably approximately 300 to approximately 850° C. and, in particular, at approximately 800° C.

The duration of the heat treatment is preferably at least approximately one hour, furthermore preferably more than approximately 15 hours and, in particular, approximately 24 hours, with the maximum duration of the heat treatment being approximately 30 hours, especially for economic reasons.

It is particularly suitable to carry out a heat-treatment stage when the manganese valency is, for example, above approximately 3.5. During this heat-treatment process, which influences the oxygen content and the Mn valency, the valency of manganese is optimized towards 3.5. In this connection, the valency indicates the average oxidation state of the manganese present in the oxide.

It is possible to reduce the Li content when employing of an elevated amount of Li, or to reduce this content generally after the actual reaction by means of an acid-leaching process which can preferably take place before the optional drying or heat treatment. It should be noted in this connection that the aqueous phase can be removed before the drying, although it is generally possible to dispense with this, for example in the case of spray drying.

The crystallinity and the specific surface area of the lithium manganese oxide obtained by the process according to the invention can be influenced by specifically controlling the temperature, pressure and reaction time during the reaction and/or the subsequent heat treatment.

The particle size of the lithium manganese oxide obtained according to the invention can be influenced by taking into account of the particle fineness of the manganese raw materials employed by preceding wet or dry milling processes. It is likewise possible to reduce the particle size by grinding the wet or elsewise dried lithium manganese oxide. The spinel obtained according to the invention preferably has an average particle size, measured using a Cilas granulometer, in the range from approximately 0.5 to approximately 100 $\mu$m, furthermore preferably from approximately 1 to approximately 50 $\mu$m.

The BET surface area of the lithium manganese oxide prepared according to the invention is preferably below approximately 10 m$^2$/g, furthermore preferably below approximately 8 m$^2$/g and, in particular, approximately 5 m$^2$/g, the lower limit being at approximately 0.1 m$^2$/g.

It is possible in the present process to carry out successfully in particular the following reaction variants:

| | | | | |
|---|---|---|---|---|
| 4MnO$_2$ + | | 2LiOH → | 2LiMn$_2$O$_4$ + | H$_2$O + ½O$_2$ |
| 3MnO$_2$ + | MnO + | 2LiOH → | 2LiMn$_2$O$_4$ + | H$_2$O |
| MnO$_2$ + | MnOOH + | LiOH → | LiMn$_2$O$_4$ + | H$_2$O |
| 2MnO$_2$ + | Mn$_2$O$_3$ + | 2LiOH → | 2LiMn$_2$O$_4$ + | H$_2$O |
| 10MnO$_2$ + | 2Mn$_3$O$_4$ + | 8LiOH → | 8LiMn$_2$O$_4$ + | H$_2$O |
| 3MnO$_2$ + | MnCO$_3$ + | 2LiOH → | 2LiMn$_2$O$_4$ + | H$_2$O + CO$_2$ |

The present invention furthermore also relates to a lithium manganese oxide of the formula Li$_{1.5-x}$Mn$_2$O$_4$ or a lithium manganese oxide of the formula Li$_{1.5-x}$M$_z$Mn$_{2-z}$O$_4$, obtainable by reacting at least one lithium compound and at least one manganese compound or at least one lithium compound, at least one manganese compound and at least one compound of a metal M, characterized in that the reaction is carried out in an aqueous medium at a temperature in the range from 80 to 500° C. under a pressure of from $1 \times 10^5$ Pa to $5 \times 10^7$ Pa.

This oxide has, of course, the same properties concering the BET surface area, the Li content and Mn content and the particle size as stated in the description of the process according to the invention.

The lithium manganese oxide described above is preferably one with a spinel structure, in particular a pure-phase Li Mn oxide with a spinel structure.

The lithium manganese oxide according to the invention or prepared according to the invention, preferably with a spinel structure, is a so-called intercalation compound. Compounds of this type are able to store active Li$^+$ ions in a host lattice, the lithium being embedded in interstitial sites in the host material. Accordingly, intercalation compounds of this type are particularly useful for electrochemical cells. Entry into and exit from interstices can be effected electrochemically with high reversibility by means of an electrolyte conducting lithium ions, preferably LiClO$_4$, LiBF$_4$, LiPF$_6$, LiSO$_3$CH$_3$, LiAsF$_6$. Combination of two different intercalation compounds with very different electrochemical potentials results in an accumulator in which lithium ions migrate forwards and backwards between the host materials during the charging and discharging processes. Electrochemical cells of this type are referred to as lithium ion cells. When a lithium manganese oxide, preferably with a spinel structure, is used, a suitable host material for the anode is, in particular, a carbon-containing substance such as, for example, graphite or coke. A cell of this type might be referred to briefly as corresponding to the Li$_x$C$_6$/Li$_{y-x}$Mn$_2$O$_4$ type.

Accordingly, the present invention also relates to the use of the lithium manganese oxide according to the invention or prepared according to the invention, preferably with a spinel structure, as cathode material or as part thereof for an electrochemical cell. The lithium manganese oxide in this case represents, where appropriate in conjunction with a binder such as, for example, PTFE and acetylene black, the cathode, while the anode preferably has as host material a carbon-containing substance as defined above, or metallic lithium.

There are in principle no special restrictions on the choice of the anode on use of the lithium manganese oxide described herein as cathode. The compounds which can be used merely need to allow intercalation of lithium ions and have a higher electrochemical activity than the cathode.

The lithium manganese oxide according to the invention or prepared according to the invention, preferably with a spinel structure, is prepared as battery cathode material in a manner known per se. This cathode material can be employed in a manner known per se in an electrochemical cell having an anode which receives lithium cations. The electrodes in such cells in the fully assembled and closed state are usually uncharged, that is to say all the available lithium is embedded in the positive electrode, while the host structure of the negative electrode is in a lithium-unloaded state. On initial charging, the lithium exits from the positive host lattice (cathode) and enters into the negative host lattice (anode), preferably a carbon matrix. Some of the lithium ions which are irreversibly attached to the carbon matrix and are unavailable for the subsequent intercalation mechanism can be compensated by an above-stoichiometric amount of lithium in the lithium manganese oxide, which preferably has a spinel structure.

The design of such electrochemical cells in principle is known and is described inter alia by J. M. Tarascon in *J. Electrochem. Soc.* 140, page 3071 ff.

On use as battery cathode material the lithium manganese oxides according to the invention or prepared according to the invention, preferably with a spinel structure, show good capacitive properties and cycle stability, as is proved by the examples.

Accordingly, the present invention also relates to an electrochemical cell which has at least one cathode which contains the lithium manganese oxide according to the invention or prepared according to the invention, preferably with a spinel structure.

The present invention is now explained in detail by some examples.

EXAMPLES

Example 1

In each case, 4 l of water were introduced into a 10 l autoclave, and 1010 g of lithium hydroxide and 4000 g of manganese dioxide were added. While stirring, the mixture was heated to an internal temperature of Batch a): 110° C., Batch b): 165° C. and Batch c): 195° C.

and kept at this temperature for 24 h. The following pressure conditions resulted:

Batch a): $4 \times 10^5$ Pa (4 bar)

Batch b): $10 \times 10^5$ Pa (10 bar) and

Batch c): $16 \times 10^5$ Pa (16 bar)

The solid was then separated from the aqueous phase by filtration, and was dried and heated at 800° C. for 24 h.

The resulting solid had the following analytical data:

TABLE 1

| Batch | Li % | Mn % | Average particle size (μm) | BET surface area m²/g | X-ray examination | Lattice constant Å | Capacity mAh/g |
|---|---|---|---|---|---|---|---|
| a) | 3.8 | 61.2 | 15.3 | 1.8 | well-crystallized, pure-phase spinel | 8.224 | 108 |
| b) | 4.0 | 60.5 | 14.5 | 1.6 | well-crystallized, pure-phase spinel | 8.224 | 115 |
| c) | 3.9 | 60.7 | 11.5 | 1.5 | well-crystallized, pure-phase spinel | 8.217 | 122 |

Example 2

4 l of water and 1010 g of lithium hydroxide were introduced into a 10 l autoclave, and in each case 4000 g of manganese dioxide raw material of varying particle size as defined below were used.

In Experiment d), a commercial manganese dioxide raw material with an average particle size of 30 μm was used.

In Experiment e), a commercial manganese dioxide raw material was used which, after dry milling, had an average particle size of 1 μm.

In Experiment f), a commercial manganese dioxide raw material was used which, after wet milling, had an average particle size of 1 μm.

The reaction temperature in the autoclave was kept at 195° C. for 24 h in all three experiments, the resulting internal pressure being $16 \times 10^5$ Pa (16 bar).

After this reaction, the solid was removed from the aqueous phase, dried and heated at 800° C. for 24 h. The resulting heat-treated products were pure-phase lithium manganese spinels with the following particle sizes:

Experiment d): 15 μm

Experiment e): 8 μm

Experiment f): 2 μm

What is claimed is:

1. Process for the preparation of a lithium manganese oxide which comprises the following step:

reacting at least one lithium compound and at least one manganese compound under conditions effective to produce a compound of the formula $Li_{1.5-x}Mn_2O_4$, wherein the value of x satisfies the relation $0 \leq x < 1.5$, said conditions including reacting said at least one lithium compound and said at least one manganese compound in an aqueous medium at a temperature in the range from 80 to 500° C. under a pressure of from $4 \times 10^5$ Pa to $5 \times 10^7$ Pa.

2. Process according to claim 1, characterized in that the at least one lithium compound is $Li_2O$, $LiOH$, $LiCl$, $LiNO_3$, $Li_2CO_3$, a Li carboxylate or a mixture of two or more thereof.

3. Process according to claim 1 or 2 characterized in that the at least one manganese compound is $MnO_2$, $MnO$, $MnOOH$, $Mn_2O_3$, $Mn_3O_4$, $MnCO_3$, $Mn(NO_3)_2$, a Mn carboxylate or a mixture of two or more thereof.

4. Process for the preparation of a lithium manganese oxide which comprises the following steps:

reacting at least one lithium compound, at least one manganese compound and at least one compound of the metal M under conditions effective to produce a compound of the formula $Li_{1.5-x}M_zMn_{2-z}O_4$ wherein x satisfies the relation $0 \leq x < 1.5$; z satisfies the relation $0.01 \leq z \leq 1$; and M is a metal of Group IIa, IIIa, IVa, IIb, IIIb, IVb, VIb, VIIb, or VIII of the Periodic Table, or a mixture of two or more thereof, said conditions including reacting said at least one lithium compound and said at least one manganese compound in an aqueous medium at a temperature in the range from 80 to 500° C. under a pressure of from $4\times10^5$ Pa to $5\times10^7$ Pa.

5. Process according to claim 1, characterized in that the process additionally comprises the following step:

drying of a product obtained from the reaction.

6. Process according to claim 1, characterized in that the process additionally comprises the following step:

heat-treating a product obtained from said reaction.

7. Lithium manganese oxide of the formula $Li_{1.5-x}Mn_2O_4$ or lithium manganese oxide of the formula $Li_{1.5-x}M_zMn_{2-z}O_4$ wherein x satisfies the relation $0 \leq x < 1.5$; z satisfies the relation $0.01 \leq z \leq 1$; and M is a metal of Group IIa, IIIa, IVa, IIb, IIIb, IVb, VIb, VIIb, or VIII of the Periodic Table, obtained by reacting at least one lithium compound and at least one manganese compound or at least one lithium compound, at least one manganese compound and at least one compound of a metal M, characterized in that the reaction is carried out in an aqueous medium at a temperature in the range of from 80 to 500° C. under a pressure of from $4\times10^5$ Pa to $5\times10^5$ Pa.

8. A cathode for use in an electrochemical cell comprising a lithium manganese oxide according to claim 7.

9. An electrochemical cell comprising an anode which contains a carbon-containing compound as host material and a cathode according to claim 8.

10. An electrochemical cell comprising a cathode comprising a lithium manganese oxide according to claim 7.

11. Process according to claim 5, further comprising the step of heat-treating a product obtained from said drying step.

12. The process of claim 1 wherein said aqueous medium is a liquid aqueous medium.

13. The lithium manganese oxide of claim 7 wherein said aqueous medium is a liquid aqueous medium.

* * * * *